US012397559B2

(12) United States Patent
Tajima et al.

(10) Patent No.: US 12,397,559 B2
(45) Date of Patent: Aug. 26, 2025

(54) LIQUID DISCHARGE HEAD AND LIQUID DISCHARGE APPARATUS

(71) Applicant: CANON KABUSHIKI KAISHA, Tokyo (JP)

(72) Inventors: Hiroki Tajima, Kanagawa (JP); Chiaki Muraoka, Saitama (JP); Kyosuke Toda, Kanagawa (JP); Takeho Miyashita, Kanagawa (JP); Shimpei Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 18/329,292

(22) Filed: Jun. 5, 2023

(65) Prior Publication Data

US 2023/0391103 A1 Dec. 7, 2023

(30) Foreign Application Priority Data

Jun. 6, 2022 (JP) ................................ 2022-091391

(51) Int. Cl.
*B41J 2/175* (2006.01)
*B41J 2/14* (2006.01)
*B41J 2/17* (2006.01)

(52) U.S. Cl.
CPC ............. *B41J 2/17596* (2013.01); *B41J 2/14* (2013.01); *B41J 2/1721* (2013.01); *B41J 2002/14475* (2013.01); *B41J 2202/12* (2013.01)

(58) Field of Classification Search
CPC ........ B41J 2/17596; B41J 2/14; B41J 2/1721; B41J 2/135; B41J 2002/14475; B41J 2202/12
See application file for complete search history.

(56) References Cited

U.S. PATENT DOCUMENTS

2020/0338889 A1* 10/2020 Ishida ................. B41J 2/14024

FOREIGN PATENT DOCUMENTS

JP 2017124617 A 7/2017

* cited by examiner

*Primary Examiner* — Jason S Uhlenhake
(74) *Attorney, Agent, or Firm* — Canon U.S.A., Inc., IP Division

(57) ABSTRACT

A liquid discharge head includes a discharge port array having a plurality of discharge ports and a supply port array having a plurality of supply ports. The discharge port array and the supply port array extend from a first to a second end of the liquid discharge head. The plurality of discharge ports includes a first-end discharge port closest to the first end and a second-end discharge port closest to the second end. The plurality of supply ports includes a first-end supply port closest to the first end and a second-end supply port closest to the second end. Seen from a position facing openings of the plurality of discharge ports, an end of an opening of the first-end supply port adjacent to the first end is at a position nearer to the first end than an end of an opening of the first-end discharge port adjacent to the first end.

18 Claims, 12 Drawing Sheets

LIQUID DISCHARGE HEAD AND LIQUID DISCHARGE APPARATUS

BACKGROUND

Field

The present disclosure relates to a liquid discharge head and a liquid discharge apparatus including the liquid discharge head.

Description of the Related Art

The recent ink jet printer field requires liquid discharge apparatuses capable of outputting high-quality print. However, if liquid discharge ports are continuously kept in contact with air for a long time, evaporation of the liquid causes thickening and sticking, which leads to a discharge failure, making it impossible to output high-quality print. To reduce or eliminate the liquid thickening and sticking due to the evaporation of the liquid, known circulating liquid discharge apparatuses circulate liquid.

For example, Japanese Patent Laid-Open No. 2017-124617 discloses a liquid discharge head, as well as a liquid discharge apparatus, including highly densely arranged discharge ports, in which a plurality of common supply channels and a plurality of common collecting channels are provided in the discharge port array to circulate liquid through pressure chambers corresponding to the plurality of discharge ports. FIG. 11 is a schematic diagram of a discharge module 800 of Japanese Patent Laid-Open No. 2017-124617 seen from the liquid discharge direction. FIG. 12 is a schematic plan view of the discharge module 800 exploded into an opening plate 810, a channel plate 820, and a nozzle plate 830. The opening plate 810 includes supply ports 812 for supplying liquid to the channel plate 820 and collection ports 811 for collecting the liquid from the channel plate 820. The channel plate 820 includes a common supply channel 822 communicating with the supply ports 812 and a common collecting channel 821 communicating with the collection ports 811, respectively. The channel plate 820 further includes individual supply channels 824 for supplying the liquid flowing through the common supply channel 822 to discharge ports 831 formed in the nozzle plate 830 and individual collecting channels 823 for collecting the liquid from the discharge ports 831 to the common collecting channel 821. In other words, by circulating the liquid flowing to the discharge module 800 through the supply ports 812, the common supply channel 822, the individual supply channels 824, the discharge ports 831, the individual collecting channels 823, the common collecting channel 821, and the collection ports 811 in this order, thickening and sticking of the liquid due to evaporation can be reduced or eliminated.

In a conventional liquid discharge apparatus having a liquid discharge head, interruption of circulation of liquid can cause sticking due to evaporation of the liquid, resulting in a discharge failure. When the circulation of the liquid is at a stop, liquid in a certain area may be less likely to be diffused than being evaporated from a discharge port, which can cause liquid sticking at the dead end, resulting in a discharge failure.

In particular, in a conventional serial liquid discharge head that discharges liquid while scanning a medium, if stopped during the scanning because of a trouble during printing, discharge ports may be left in contact with air for a long period of time. Therefore, the liquid sticking and discharge failure described above are more likely to occur.

SUMMARY

The present disclosure provides a liquid discharge head and a liquid discharge apparatus in which liquid sticking and discharge failure can be reduced or eliminated.

According to an aspect of the present disclosure, a liquid discharge head includes a discharge port array in which a plurality of discharge ports configured to discharge liquid is arrayed, a plurality of pressure chambers individually communicating with the plurality of discharge ports, a common supply channel configured to supply liquid to the plurality of pressure chambers, and a supply port array in which a plurality of supply ports configured to supply liquid to the common supply channel is arrayed, wherein the discharge port array and the supply port array extend from a first end of the liquid discharge head to a second end of the liquid discharge head, wherein the plurality of discharge ports in the discharge port array includes a first-end discharge port closest to the first end and a second-end discharge port closest to the second end, wherein the plurality of supply ports in the supply port array includes a first-end supply port closest to the first end and a second-end supply port closest to the second end, and wherein, as seen from a position facing openings of the plurality of discharge ports, an end of an opening of the first-end supply port adjacent to the first end is at a position nearer to the first end than an end of an opening of the first-end discharge port adjacent to the first end.

Further features of the present disclosure will become apparent from the following description of exemplary embodiments with reference to the attached drawings.

DESCRIPTION OF THE EMBODIMENTS

Embodiments of the present disclosure will be described hereinbelow with reference to the drawings. It is to be understood that the following embodiments do not limit the present disclosure and that not all of combinations of the features described in the embodiments are absolutely necessary for the solution of the present disclosure. Like components are denoted by like reference signs.

First Embodiment

Figure 1:
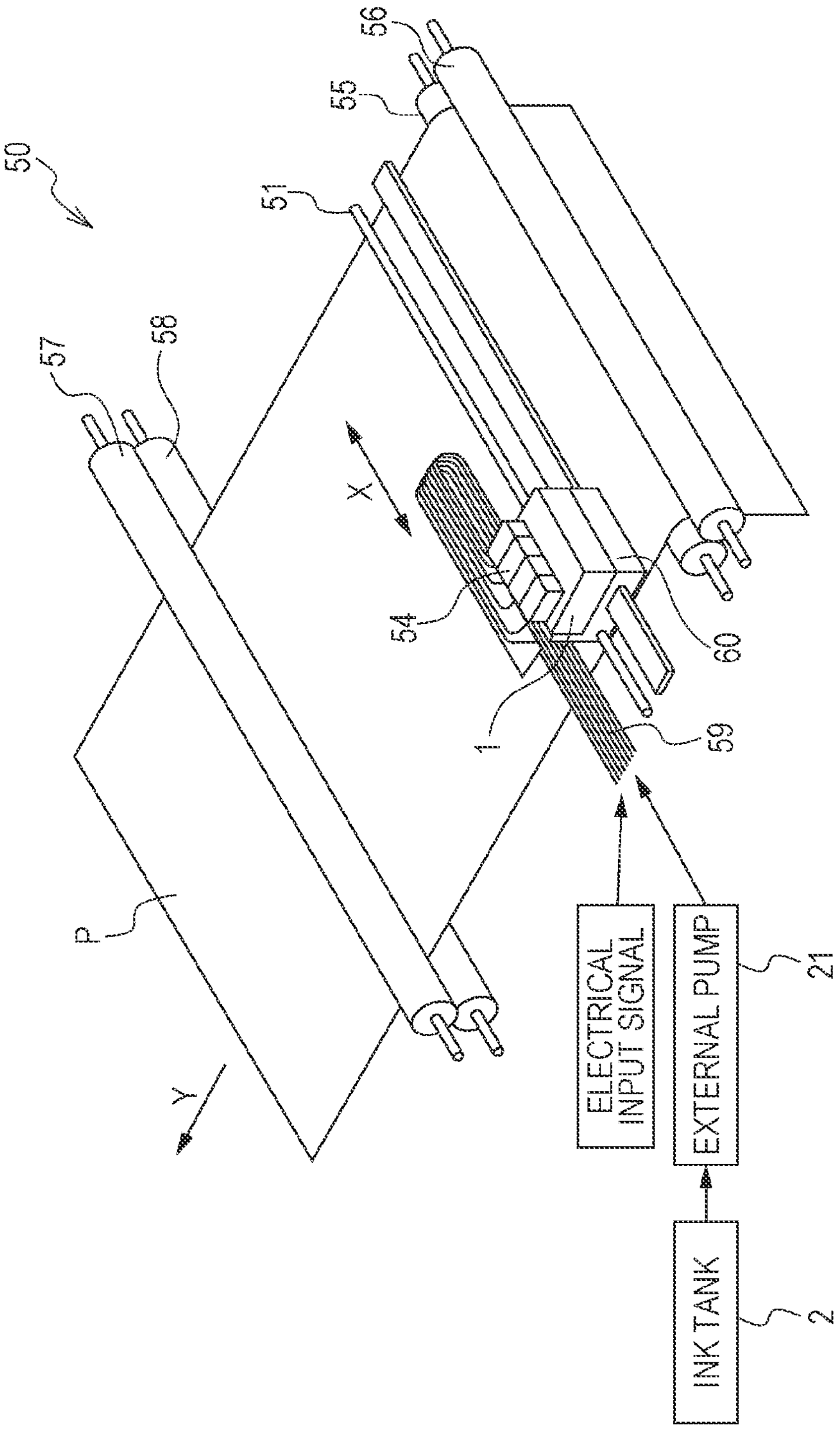
FIG. 1 is a schematic diagram of a liquid discharge apparatus.

FIG. 1 is a schematic perspective view of a liquid discharge apparatus 50 including a liquid discharge head 1. The liquid discharge apparatus 50 of this embodiment is a serial ink-jet printing apparatus that discharges ink, or liquid, while moving the liquid discharge head 1 to print on a recording medium P. Another example is a what-is-called full-line liquid discharge head including discharge ports across the width of the recording medium P so as to be capable of discharge across the width of the recording medium P without moving in a main scanning direction, described below.

The liquid discharge head 1 is mounted on a mount (a carriage 60). The carriage moves back and forth in the main scanning direction (X-direction) along a guide shaft 51. The recording medium P is conveyed in a sub-scanning direction (Y-direction) intersecting (in this example, at right angles) the main scanning direction by conveying rollers 55, 56, 57, and 58. The liquid discharge head 1 is detachably attached to the carriage 60 by the user.

The liquid discharge head 1 includes a circulation unit 54 and a discharge unit 3, described below. The discharge unit 3 includes a plurality of discharge ports for discharging liquid and energy generating elements that generate discharge energy for discharging liquid from the individual discharge ports, the specific configuration of which will be described below.

The liquid discharge apparatus 50 includes an ink tank 2, which is an ink supply source, and an external pump 21. The ink stored in the ink tank 2 is supplied to the circulation unit 54 through ink supply tubes 59 with the driving force of the external pump 21.

The liquid discharge apparatus 50 forms a predetermined image on the recording medium P by repeating a recording scanning operation in which the liquid discharge head 1 mounted on the carriage 60 discharges ink while moving back and forth in the main scanning direction and a conveying operation of conveying the recording medium P in the sub-scanning direction. The liquid discharge head 1 of this embodiment is capable of discharging four kinds of ink, black (K), cyan (C), magenta (M), and yellow (Y), and can record a full-color image with the inks. The ink that the liquid discharge head 1 can discharge is not limited to the above four kinds of ink. The present disclosure is also applicable to liquid discharge heads for discharging other kinds of ink. In other words, the kind and number of inks discharged from the liquid discharge head are not limited. In the case where a cap member (not shown) is disposed off the conveying path of the recording medium P, when no printing operation is to be performed, the cap member is relatively moved to a position where the face of the liquid discharge head 1 is to be covered to prevent the discharge ports from drying, or a sucking operation is performed for charging or recovery.

Figure 2B:
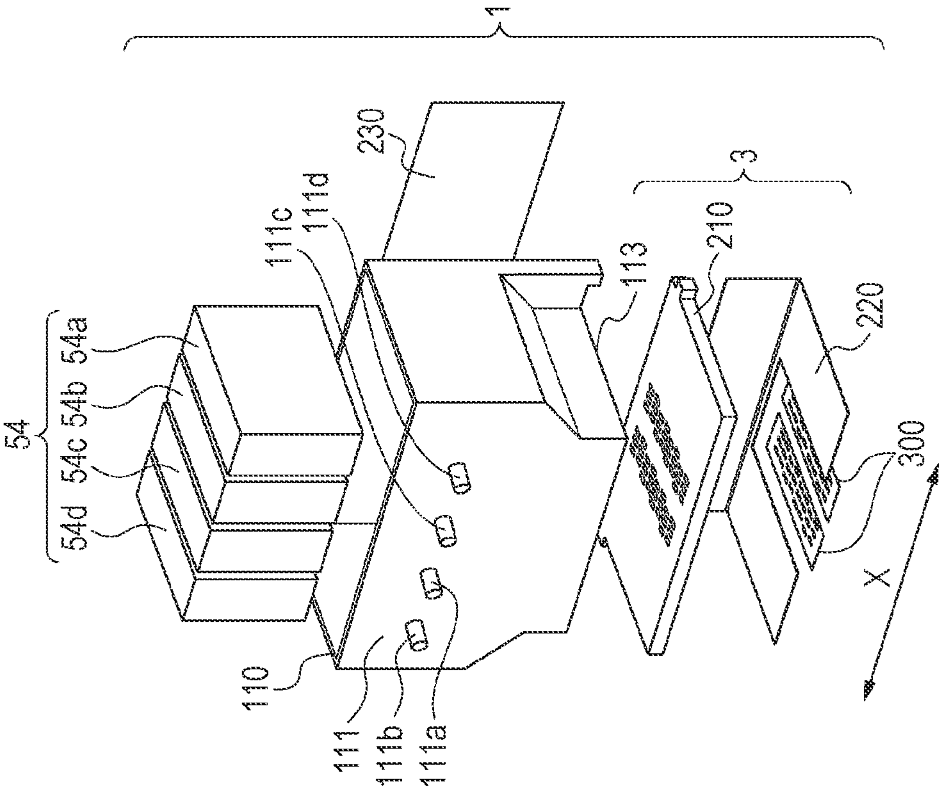
FIG. 2B is an exploded view of the liquid discharge head.
Figure 2A:
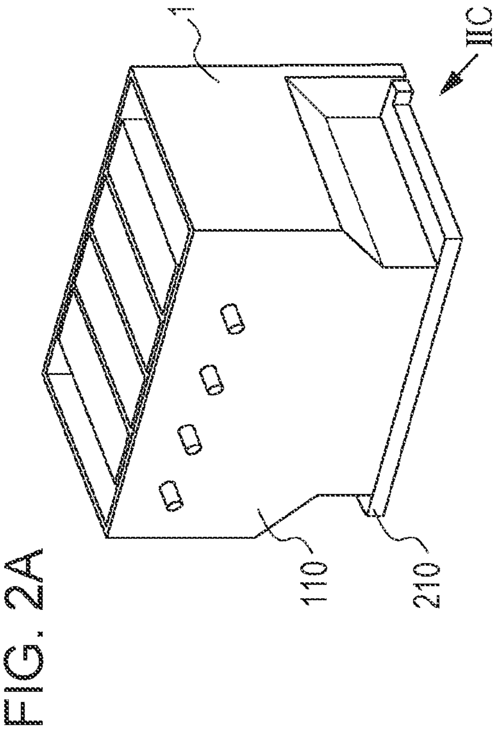
FIG. 2A is a perspective view of the liquid discharge head.
Figure 2C:
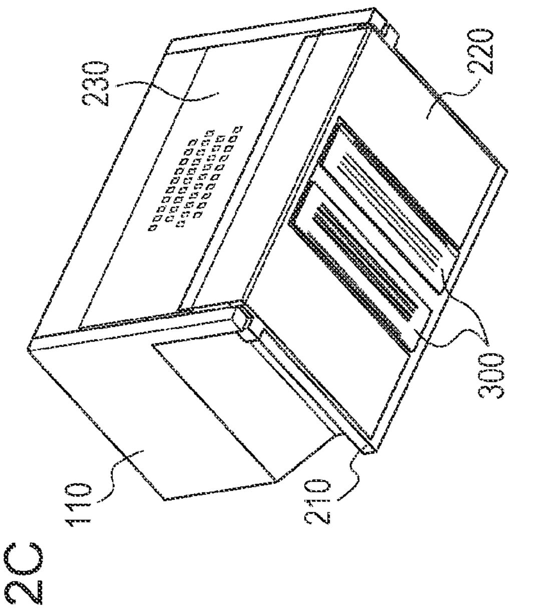
FIG. 2C is a bottom view of the liquid discharge head.

FIGS. 2A to 2C are schematic diagrams of the liquid discharge head 1. FIG. 2A is a schematic perspective view of the liquid discharge head 1. FIG. 2C is a diagram of the liquid discharge head 1 seen from arrow IIC in FIG. 2A. The outer shape of the liquid discharge head 1 is formed by a casing 110 and a supporting member 210. FIG. 2B is an exploded perspective view of the liquid discharge head 1. The liquid discharge head 1 includes four circulation units 54 corresponding to four kinds of ink. The circulation unit 54 includes circulation units 54*a* to 54*d* corresponding to the individual inks. The circulation units 54*a* to 54*d* are connected to the casing 110. The casing 110 has a joint surface 111 for receiving ink from the printing apparatus. The joint surface 111 is provided with joints 111*a* to 111*d* communicating with the circulation units 54*a* to 54*d*, respectively. In mounting the liquid discharge head 1 to the printing apparatus, the ink supply tubes 59 corresponding to the individual inks are connected from the printing apparatus to the joints 111*a* to 111*d*. The inks supplied through the ink supply tubes 59 pass through the joints 111*a* to 111*d* of the casing 110 to the circulation units 54*a* to 54*d*. A plurality of circulation units 54 may be provided for the same kind of liquid.

In FIG. 2B, the liquid discharge head 1 includes the circulation unit 54. The circulation unit 54 includes a pressure adjusting unit (not shown) and a pump. An example of the pump is a diaphragm pump. Any pump capable of circulating liquid may be employed. The liquid discharge head 1 does not have to include the circulation unit 54. In other words, a circulation unit provided outside the liquid discharge head 1 may be used to circulate the liquid in the liquid discharge head 1 to the external circulation unit.

The bottom 113 of the casing 110 connects to a supporting member 210 on which a discharge module 300, to be described later, is mounted. The ink supplied to the circulation units 54*a* to 54*d* is supplied to the supporting member 210 through the casing 110. In FIG. 2C, two discharge modules 300 are joined to the supporting member 210. Alternatively, one or three or more discharge modules 300 may be joined. The discharge modules 300 and the supporting member 210 are bonded with an adhesive. The discharge modules 300 includes a silicon substrate with a thickness of 0.5 mm to 1 mm and a plurality of energy generating elements 36 (FIG. 4A) provided on one surface of the silicon substrate and for discharging liquid. In this embodiment, heating resistive elements are used as the energy generating elements 36, which generate heat using electric power supplied from a printed circuit board 230 via an electric wiring board 220. The silicon substrate includes a plurality of pressure chambers corresponding to the heating resistive elements and a plurality of discharge ports for discharging ink formed using a photolithographic technique. In this embodiment, the heating resistive elements are used as the energy generating elements 36. This is given for mere illustrative purposes. In other words, a liquid discharge method of using piezoelectric elements as energy generating elements or another discharge method may be employed.

Figure 3A:
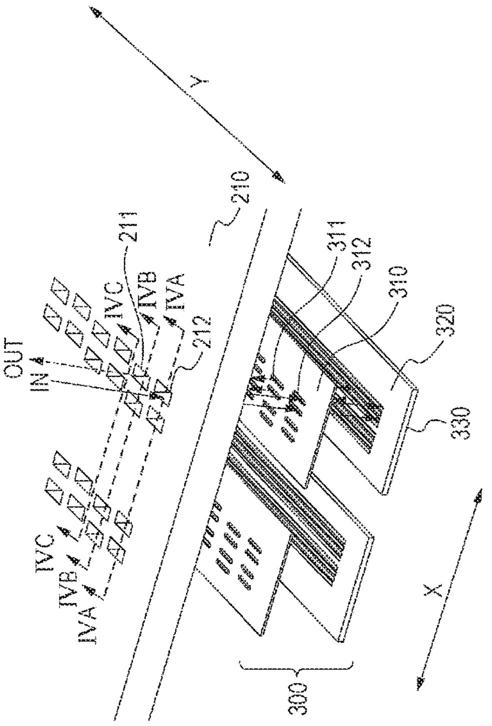
FIG. 3A is a schematic top view of the discharge unit illustrating the circulation paths.
Figure 3B:
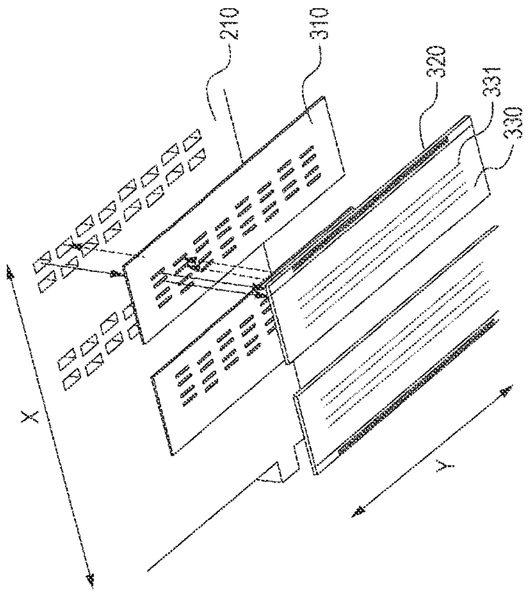
FIG. 3B is a schematic bottom view of the discharge unit illustrating the circulation paths.

FIGS. 3A and 3B are schematic diagrams illustrating the circulation path in the discharge unit 3. FIG. 3A is an exploded perspective view of the discharge unit 3 seen from the supporting member 210. FIG. 3B is an exploded perspective view of the discharge unit 3 seen from the nozzle plate 330. The ink channel in the discharge unit 3 is constituted by the supporting member 210 and the discharge module 300. The arrows in FIGS. 3A and 3B indicate the circulation flow of the liquid in the discharge unit 3. The solid arrows indicate the flow of liquid supplied from the supporting member 210 to the discharge module 300. The dashed arrows indicate the flow of liquid collected from the discharge module 300 to the supporting member 210. The ink flow is described for one color only, but the same applies to the other colors.

The supporting member 210 includes a plurality of supporting member supply ports 212 and a plurality of supporting member collection ports 211. The liquid supplied from the liquid discharge apparatus 50 to the liquid discharge head 1 or the liquid supplied from the circulation unit 54 is supplied to the discharge module 300 through the supporting member supply ports 212. The liquid not discharged by the discharge module 300 is collected to the circulation unit 54 through the supporting member collection ports 211. If the liquid discharge head 1 does not include the circulation unit 54, the liquid may be collected by a circulation unit outside the liquid discharge head 1.

The discharge module 300 is a unit serving as a liquid discharge head, and the discharge module 300 itself is also referred to as a liquid discharge head. The discharge module 300 is a lamination of an opening plate 310, a channel plate 320, and a nozzle plate 330 layered in this order from the supporting member 210. These plates are superposed and joined so that the liquid channels communicate to constitute the discharge module 300 and are supported by the supporting member 210.

The opening plate 310 includes, on a surface adjacent to the supporting member 210, a supply port array in which supply ports 312 communicating with the supporting member supply ports 212 are arrayed and a collection port array in which collection ports 311 communicating with the supporting member collection ports 211 are arrayed. The supply port array is an array of a plurality of supply ports for supplying liquid to one common supply channel 322, described later. Likewise, the collection port array is an array of a plurality of collection ports for collecting liquid from one common collecting channel 321, described later.

Although FIGS. 3A and 3B illustrate multiple supply ports 312 and collection ports 311, the number of the supply port 312 and the collection ports 311 may be one, or one of them may be multiple, and the other may be only one.

The channel plate 320 includes, on a surface adjacent to the opening plate 310, a common supply channel 322 communicating with the supporting member supply ports 212 and a common collecting channel 321 communicating with the supporting member collection ports 211. The channel plate 320 includes, on a surface adjacent to the nozzle plate 330, individual supply channels 324 each connecting the common supply channel 322 with a pressure chamber 325 (FIGS. 4A to 4C) formed in the nozzle plate 330 and individual collecting channels 323 each connecting the common collecting channel 321 with the pressure chamber 325. The nozzle plate 330 has a discharge port array in which a plurality of discharge ports 331 that discharges liquid is arrayed. The plurality of discharge ports 331 communicates with the plurality of pressure chambers 325, respectively. The pressure generated by the energy generating element 36 acts on the liquid in each pressure chamber 325 to cause the liquid to be discharged from the discharge port 331. The liquid not discharged is collected from the pressure chamber 325 into the common collecting channel 321 and the collection port 311 through the individual collecting channel 323.

Figure 10:
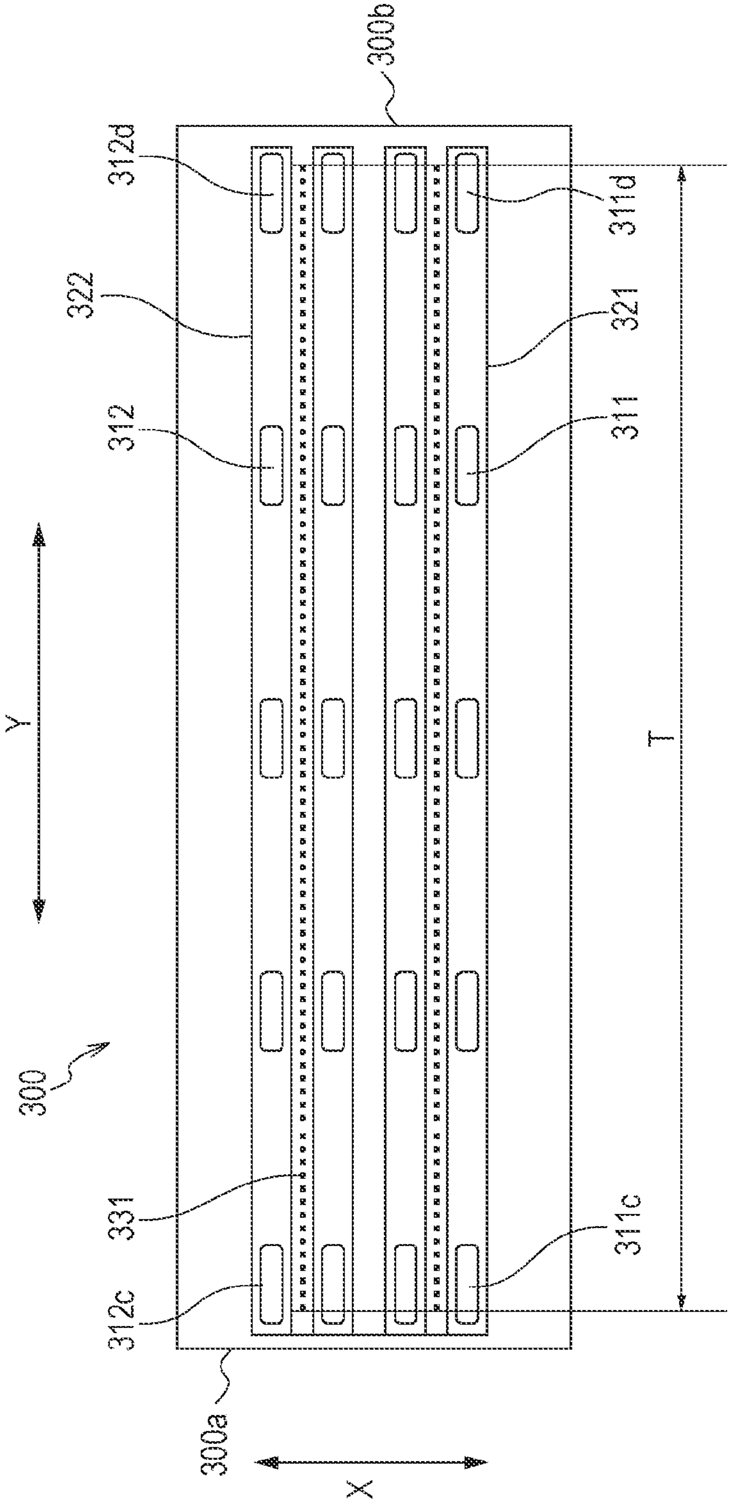
FIG. 10 is a schematic diagram of a discharge module of a second embodiment.

In other words, the liquid in the discharge module 300 circulates through the supply port 312, the common supply channel 322, the individual supply channel 324, the pressure chamber 325, the individual collecting channel 323, the common collecting channel 321, and the collection port 311 in this order. The presence of the common supply channel 322 and the individual supply channel 324 allows the liquid flowing from the supply port 312 to be directed to the position where the discharge port 331 is formed. Likewise, the presence of the common collecting channel 321 and the individual collecting channel 323 allows the liquid not discharged from the discharge port 331 to be directed to the position where the collection port 311 is formed. The supply ports 312 and the collection ports 311 of the opening plate 310 are formed in a staggered arrangement. If not in the staggered arrangement, the supply ports 312 and the collection ports 311 may be arranged in parallel in a straight line, as shown in FIG. 10, described later. This increases the length of the liquid discharge head in the X-direction (lateral direction). For this reason, the supply ports 312 and the collection ports 311 may be formed in a staggered arrangement in the viewpoint of production cost.

As shown in FIG. 10, described later, the supply ports 312 and the collection ports 311 may be formed in parallel.

Figures 4A, 4B, 4C:
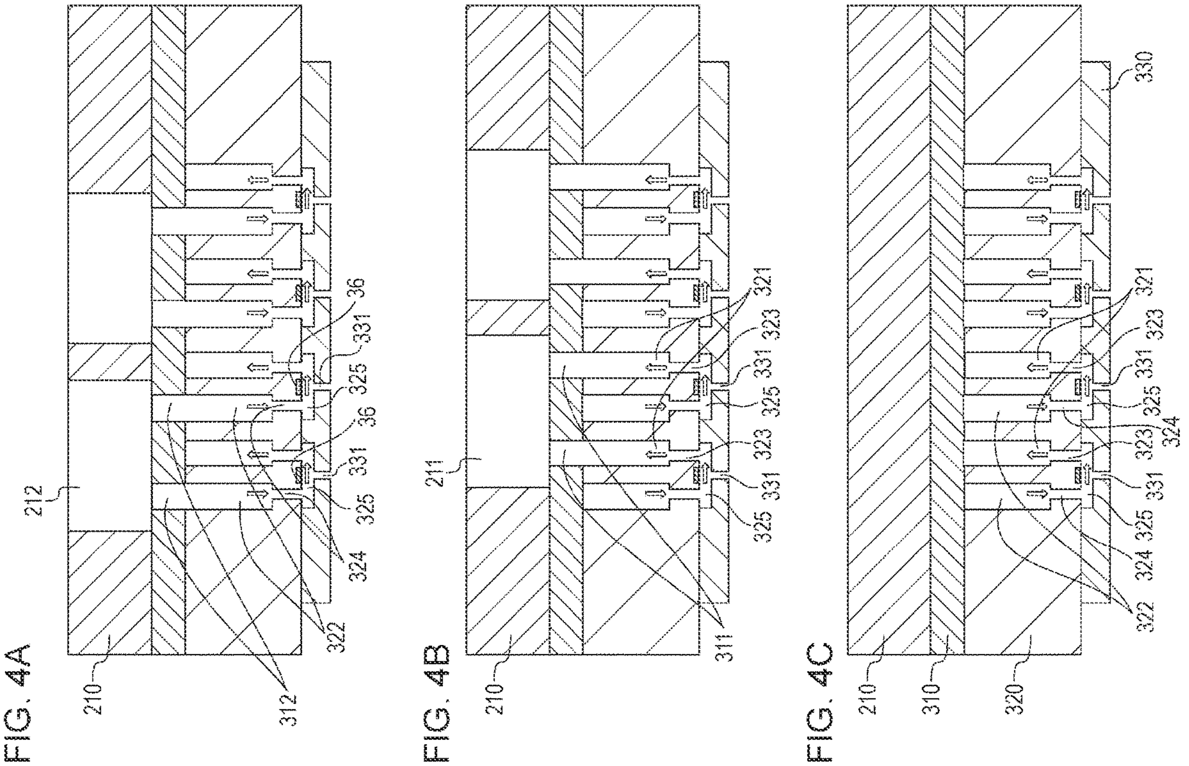
FIG. 4A is a cross sectional view taken along line IVA-IVA in FIG. 3A.
FIG. 4B is a cross sectional view taken along line IVB-IVB in FIG. 3A.
FIG. 4C is a cross sectional view taken along line IVC-IVC in FIG. 3A.

FIGS. 4A to 4C are cross-sectional views of the discharge unit 3 illustrating ink flows at different portions. FIG. 4A illustrates a cross section taken along line IVA-IVA in FIG. 3A, where the supporting member supply ports 212 and the supply ports 312 of the discharge unit 3 communicate with each other. FIG. 4B illustrates a cross section taken along line IVB-IVB in FIG. 3A, where the supporting member collection ports 211 and the collection ports 311 of the discharge unit 3 communicate with each other. FIG. 4C illustrates a cross section taken along line IVC-IVC in FIG. 3A, where the collection ports 311 and the supply ports 312 do not communicate with the channels of the supporting member 210.

The supply channel for supplying liquid supplies the liquid from a portion where the supporting member supply port 212 of the supporting member 210 and the supply port 312 of the opening plate 310 are superposed and communicate with each other, as shown in FIG. 4A. The collection channel for collecting liquid collects the liquid from a portion where the supporting member collection port 211 of the supporting member 210 and the collection port 311 of the opening plate 310 are superposed and communicates with each other, as shown in FIG. 4B. When the circulation of the liquid is at a stop, the liquid supplied from the collection channel to the pressure chamber 325 is more likely to be diffused than being evaporated from the discharge port 331. As shown in FIG. 4C, the discharge unit 3 partially includes an area of the opening plate 310 having no opening. In such an area, no liquid is supplied and collected between the supporting member 210 and the discharge module 300. Liquid is supplied in the area in which the supply ports 312 are provided, as shown in FIG. 4A, and is collected in the area where the collection ports 311 are provided, as shown in FIG. 4B.

Since the discharge ports 331 are disposed in the paths connecting the individual supply channels 324 and the individual collecting channels 323, flows from the individual supply channels 324 to the individual collecting channels 323 are generated in the pressure chambers 325 in the vicinity of the discharge ports 331. The flows are generated over the length from the first end to the second end of the discharge port array. This increases the liquid circulation efficiency to keep the liquid in the pressure chambers 325 constantly fresh, thereby preventing issues, such as thickening and sticking due to evaporation.

Figure 11:
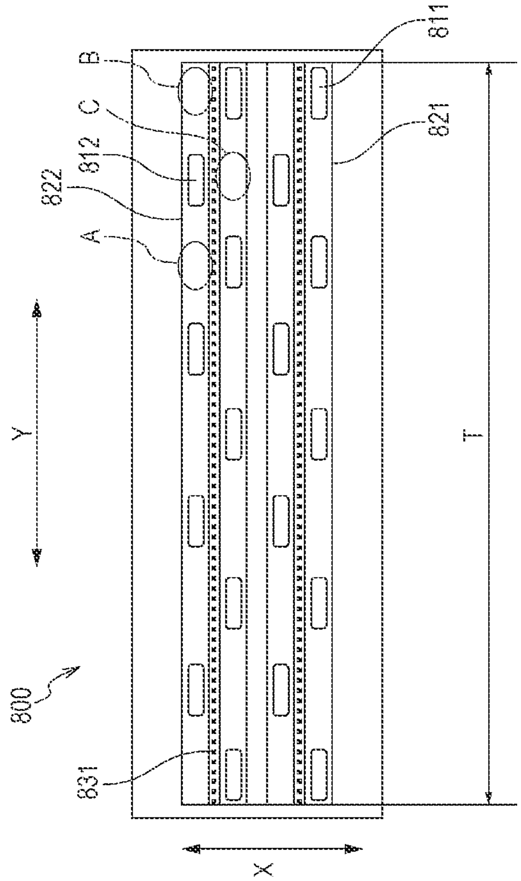
FIG. 11 is a schematic diagram of a discharge module in related art.
Figure 12:
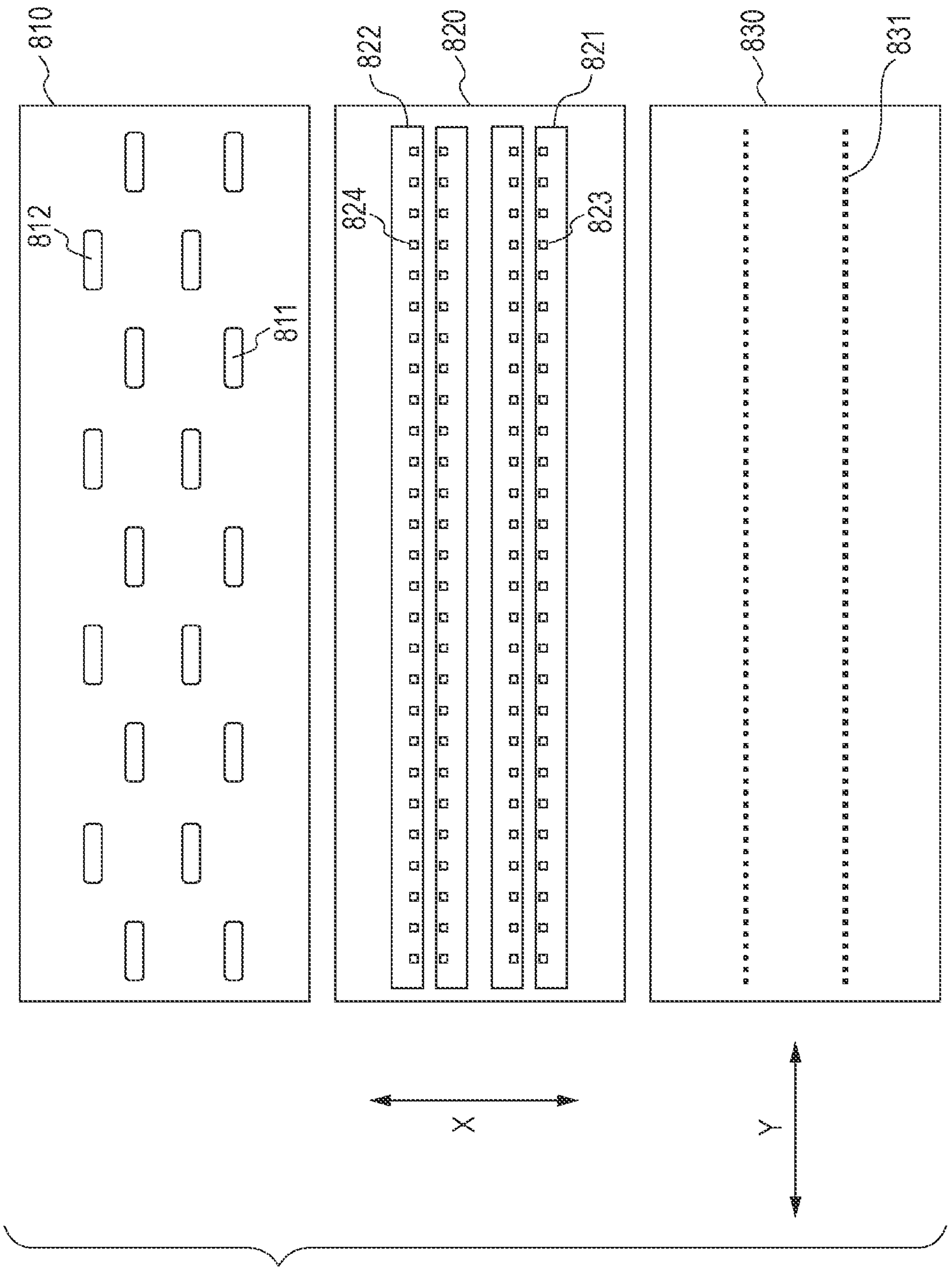
FIG. 12 is an exploded schematic diagram of the discharge module in the related art.

The known opening plate 810 shown in FIG. 11 has the supply ports 812 and the collection ports 811 formed in a staggered arrangement, as described above. This produces a dead end (area B) in an intermediate point of the channel from the supply ports 812 to the discharge ports 831 of the common supply channel 822.

Figure 5:
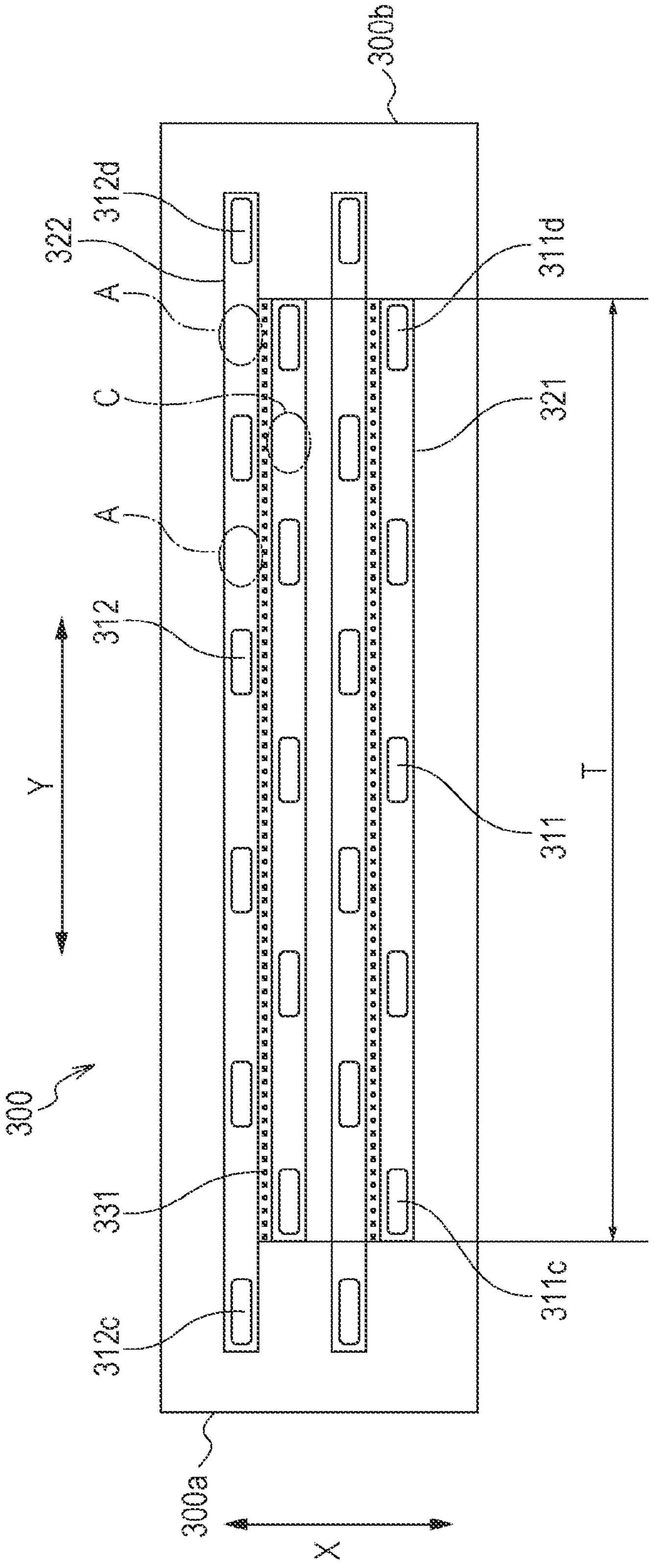
FIG. 5 is a schematic diagram of a discharge module.
Figure 6:
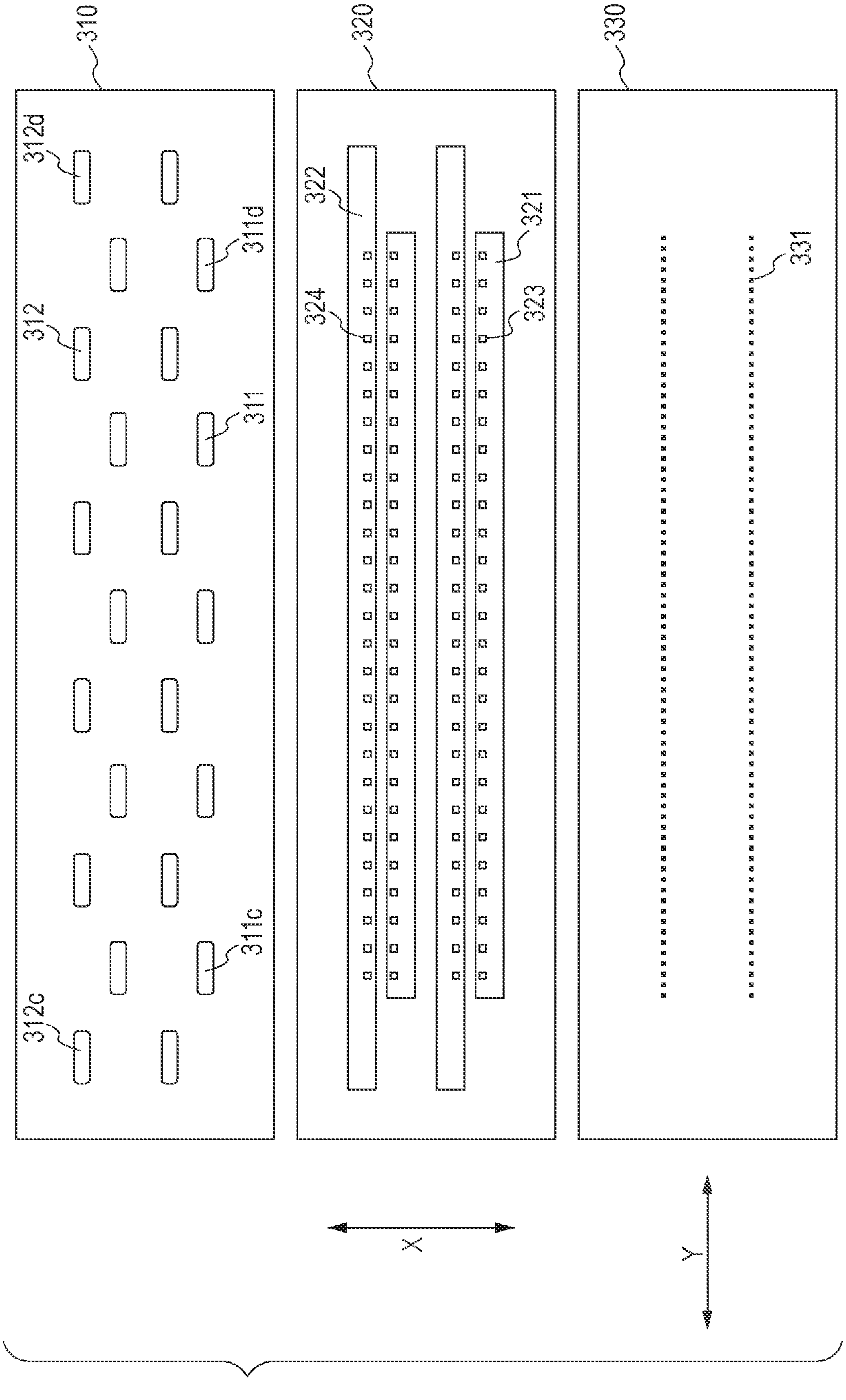
FIG. 6 is an exploded schematic diagram of the discharge module.
Figure 7:
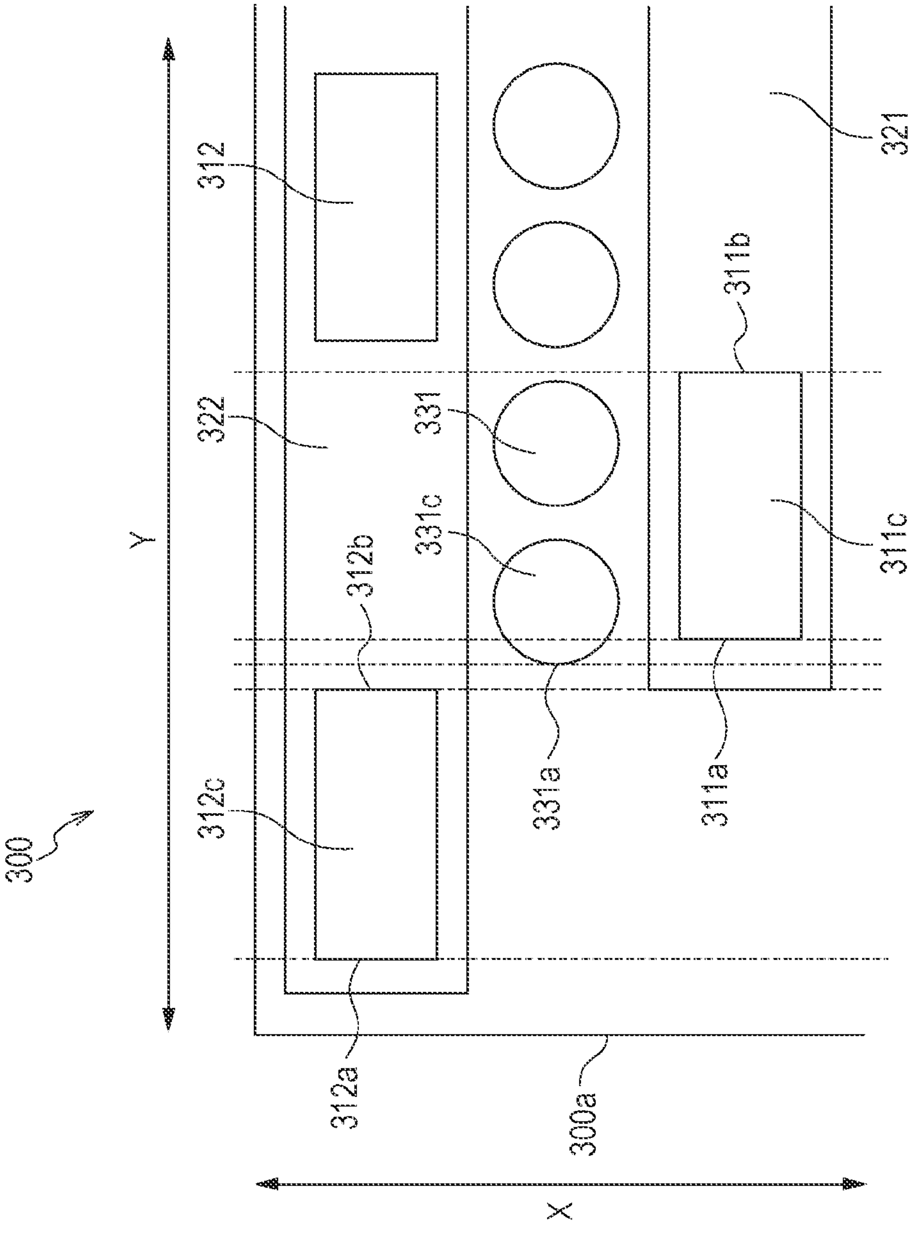
FIG. 7 is an enlarged view of a first end of the discharge module.

FIG. 5 is a schematic diagram of the discharge module 300 of this embodiment seen from the supporting member 210 (opening plate 310). FIG. 6 is a schematic plan view of the discharge module 300 exploded into the opening plate 310, the channel plate 320, and the nozzle plate 330. FIG. 7 is a schematic diagram of a first end of the discharge module 300 shown in FIG. 5 in an enlarged view. Also in this embodiment, the plurality of supply ports 312 and the plurality of collection ports 311 are formed in a staggered arrangement in the viewpoint of production cost.

In the present disclosure, the discharge port array of the discharge ports 331 and the supply port array of the plurality of supply ports 312 extend in the Y-direction from a first end 300*a* to a second end 300*b* of the discharge module 300 (liquid discharge head). The plurality of discharge ports 331 in the discharge port array includes a first-end discharge port 331*c* disposed closest to the first end 300*a* and a second-end discharge port 331*d* disposed closest to the second end 300*b*. The plurality of supply ports 312 in the supply port array includes a first-end supply port 312*c* disposed closest to the first end 300*a* and a second-end supply port 312*d* disposed closest to the second end 300*b*. In this embodiment, a partial area of the opening of the first-end supply port 312*c* is formed outside an end 331*a* of the opening of the first-end discharge port 331*c* in the Y-direction. In other words, an end 312*a* of the opening of the first-end supply port 312*c* adjacent to the first end 300*a* (hereinafter referred to as "first-side end") is nearer to the first end 300*a* than a first-side end 331*a* of the opening of the first-end discharge port 331*c* seen from a position facing the opening of the discharge ports 331. The end of the opening of the supply port and the end of the opening of the discharge port are respectively closest to the first end 300*a* or the second end 300*b* of the discharge module 300 among the respective openings. This is the same for the collection ports 311 as for the supply ports 312.

In FIG. 7, the supply ports 312 and the collection ports 311 are rectangular. However, this is given for illustrative purposes, and any other shape that functions as the supply ports 312 and the collection ports 311 may be employed. Likewise, the shape of the discharge ports 331 need not be circular and may be any shape that allows liquid to be discharged.

The above configuration has no dead end (the area B in FIG. 11) at an intermediate point of the channel from the supply ports 312 to the discharge ports 331 in the common supply channel 322. This allows the supply channel to have only the area A between the two supply ports 312, where liquid is supplied from the two supply ports 312. In the case where the collection channel is disposed as in FIG. 5, only the area C between the two collection ports 311, where the liquid is collected to the two collection ports 311, is formed. As a result, a dead end where the liquid circulation flow tends to stagnate is not formed. A dead end where diffusion of liquid is less likely to occur than evaporation from the discharge ports 331 is not present in both the supply channel and the collection channel. This configuration prevents a liquid flow from being blocked even when circulation of liquid circulation is at a stop. This configuration reduces or eliminates liquid sticking and discharge failure.

Here, the common supply channel 322 communicating with the supply ports 312 may extend outward in the Y-direction from the first end or the second end of the discharge port array. In other words, the length of the common supply channel 322 may be larger than the length T of the discharge port array in the direction in which the supply port array extends.

With this configuration of the supply ports 312 and the common supply channel 322, the supply ports 312 and the common supply channel 322 located outside the discharge port array are present also at a position not overlapping with the energy generating elements 36 that generate heat to discharge liquid in the vertical direction. This allows the liquid not heated by the energy generating elements 36 to be supplied to the pressure chambers 325 through the supply ports 312 and the common supply channel 322 located outside the discharge port array. Accordingly, fresh liquid at near room temperature not heated by the energy generating elements 36 can be supplied to the ends of the discharge ports 331.

Even without the dead end (area B) in FIG. 11, the liquid flow tends to stagnate at the ends of the common supply channel 322. Here, the ends of the common supply channel 322 are channel walls of the common supply channel 322 closest to the opposite ends of the discharge module 300. The ends of the common supply channel 322 extend outward in the Y-direction from the discharge port array, so that the discharge ports 331 and the ends of the common supply channel 322 are not aligned in the vertical direction. This reduces the effect of the liquid sticking at the ends of the common supply channel 322 on the discharge of liquid from the discharge ports 331.

In FIG. 7, the entire area of the first-end supply port 312*c* is formed outside the end 331*a* of the opening of the first-end discharge port 331*c* in the Y-direction. In other words, an end 312*b* of the opening of the first-end supply port 312*c* adjacent to the second end 300*b* (hereinafter referred to as "second-side end") is formed at a position nearer to the first end 300*a* than the first-side end 331*a* of the opening of the first-end discharge ports 331*c*. This configuration also does not have a dead end where the liquid flow tends to stagnate, preventing liquid sticking and discharge failure. This configuration also increases the amount of liquid, of the liquid to be supplied to the discharge ports 331, not heated by the heat generated by the energy generating elements 36.

Figure 8:
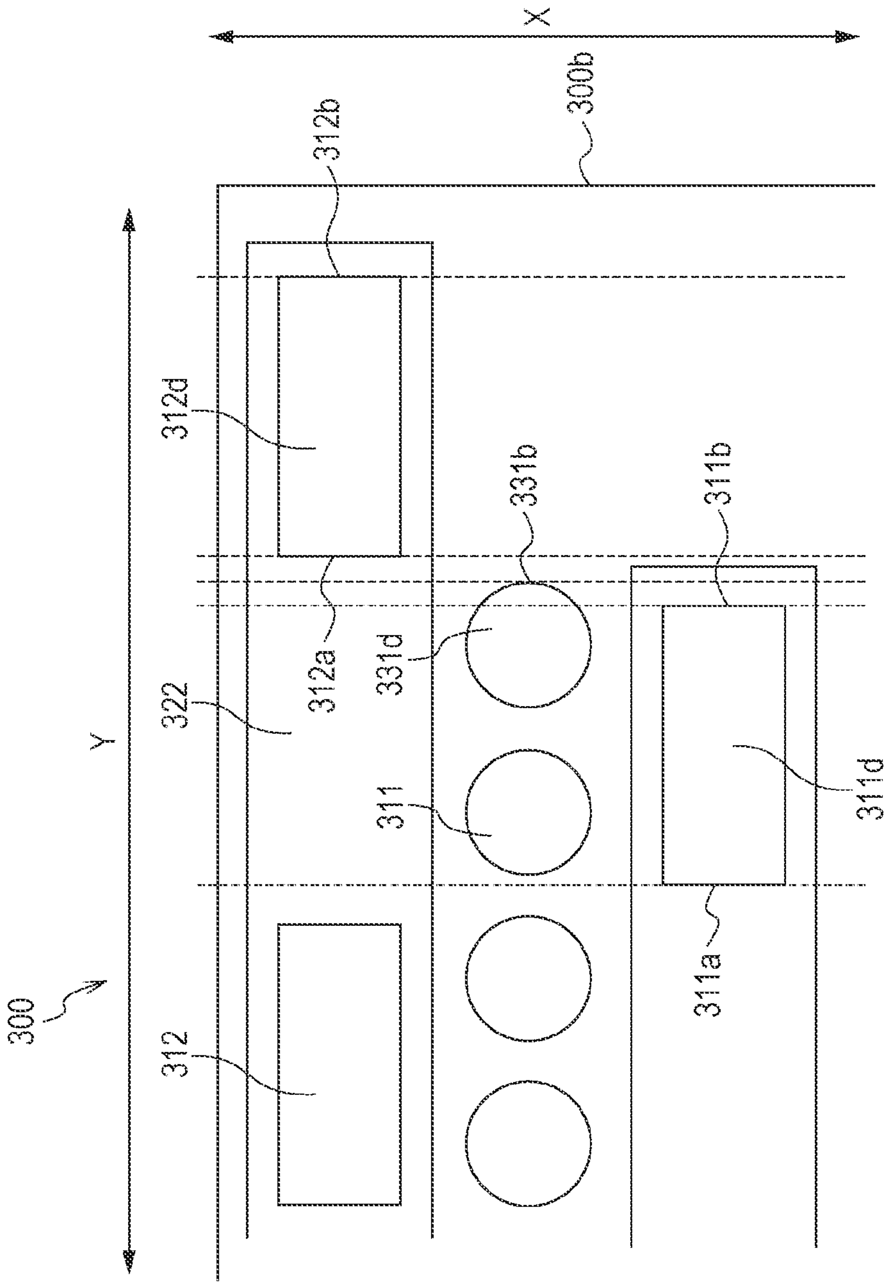
FIG. 8 is an enlarged view of a second end of the discharge module.

FIG. 8 is an enlarged schematic diagram of the second end 300*b* of the discharge module 300 in FIG. 5.

The second end 300*b*, with the same configuration as the first end 300*a*, increases the effect of the present disclosure. In other words, a partial area of the opening of the second-end supply port 312*d* may be formed outside an end 331*b* of the opening of the second-end discharge port 331*d* in the Y-direction. In other words, the second-side end 312*b* of the opening of the second-end supply port 312*d* may be formed at a position nearer to the second end 300*b* than the second-side end 331*b* of the opening of the second-end discharge port 331*d*.

The entire area of the opening of the second-end supply port 312*d* may be formed the end 331*b* of the opening of the second-end discharge port 331*d* in the Y-direction. In other words, the first-side end 312*a* of the opening of the second-end supply port 312*d* is formed at a position nearer to the second end 300*b* than the second-side end 331*b* of the opening of the second-end discharge port 331*d*.

In this embodiment, the collection ports 311, with the same configuration as the supply ports 312, increase the effect of the present disclosure. In other words, the collection ports 311, formed outside the discharge port array, also have no dead end in the common collecting channel 322 between the collection ports 311 and the discharge ports 331. This allows the liquid in the area C to be collected to the two collection ports 311 during liquid circulation. When the circulation is at a stop, only the area C where the liquid is supplied from the two collection ports 311 because of the diffusion of the liquid is formed from the collection ports 311 to the discharge ports 331 in the common collecting channel 322. This reduces the possibility of blocking of the liquid flow, reducing or eliminating liquid sticking and discharge failure.

The plurality of collection ports 311 in the collection port array includes a first-end collection port 311*c* closest to the first end 300*a* and a second-end collection port 311*d*. A partial area of the opening of the first-end collection port 311*c* may be formed outside the end 331*a* of the opening of the first-end discharge port 331*c* in the Y-direction. In other words, the first-side end 311*a* of the opening of the first-end collection port 311*c* may be formed nearer to the first end 300*a* than the first-side end 331*a* of the opening of the first-end discharge port 331*c*.

Furthermore, the entire area of the opening of the first-end collection port 311*c* may be formed outside the end 331*a* of the opening of the first-end discharge port 331*c* in the Y-direction. In other words, a second-side end 311*b* of the opening of the first-end collection port 311*c* may be at a position nearer to the first end 300*a* than the first-side end 331*a* of the opening of the first-end discharge port 331*c*.

The collection ports 311 on the second end 300*b*, with the same configuration as on the first end 300*a*, further improve the effect of the present disclosure. In other words, a partial area of the opening of the second-end collection port 311*d* may be formed outside the end 331*b* of the opening of the second-end discharge port 331*d* in the Y-direction. In other words, the second-side end 311*b* of the opening of the second-end collection port 311*d* may be formed at a position nearer to the second end 300*b* than the second-side end 331*b* of the opening of the second-end discharge port 331*d*.

Furthermore, the entire area of the opening of the second-end collection port 311*d* may be formed outside the end 331*b* of the opening of the second-end discharge port 331*d* in the Y-direction. In other words, a first-side end 311*a* of the opening of the second-end collection port 311*d* is formed at a position nearer to the second end 300*b* than the second-side end 331*b* of the opening of the second-end discharge port 331*d*.

Figure 9:
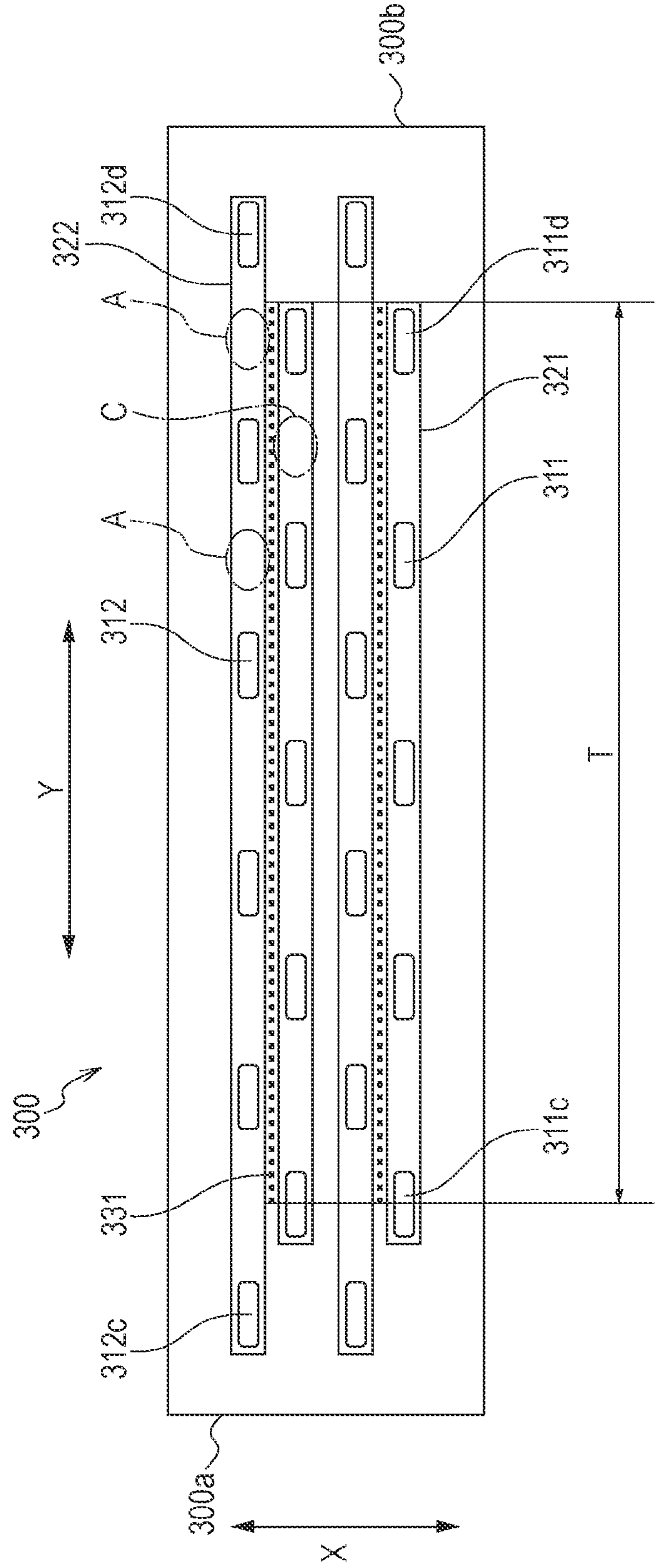
FIG. 9 is a schematic diagram of the discharge module.

Even without the dead end (area B) in FIG. 11, the liquid flow tends to stagnate at the ends of the common collecting channel 321, as in the common supply channel 322. Here, the ends of the common collecting channel 321 are channel walls of the common collecting channel 321 closest to the opposite ends of the discharge module 300. In FIG. 9, the ends of the common collecting channel 321 extend outward in the Y-direction from the discharge port array. In other words, the length of the common collecting channel 321 is larger than the length T of the discharge port array in the direction in which the supply port array extends, so that the discharge ports 331 and the ends of the common collecting channel 321 are not aligned in the vertical direction. This reduces the possibility of blocking of the liquid flowing in the common collecting channel 321.

The configuration in which the collection ports 311 at the opposite ends of the collection port array are nearer to the opposite ends of the discharge module 300 than the discharge ports 331 produces the effect of easily removing bubbles and foreign particles generated at the ends of the discharge port array, the common collecting channel, and the collection port array.

In FIG. 5, the openings of the plurality of supply ports and the openings of the plurality of collection ports are not aligned in the direction in which the discharge port array extends. The number of supply ports for supplying liquid to one common supply channel 322 is six, end the number of collection ports for collecting the liquid from one common collecting channel 321 is five. However, the numbers of the supply ports 312 and the collection ports 311 are not limited to the ones described above. In other words, the number of supply ports 312 and the number of collection ports 311 may be any number.

Since the liquid that has passed through the supply ports 312 are generally discharged from the discharge ports 331, the liquid flowing through the collection ports 311 is less than the liquid flowing through the supply ports 312. For this reason, the number of supply ports 312 may be larger than the number of collection ports 311. In this case, the common supply channel 322 may be longer than the common collecting channel 321 in the direction in which the discharge port array extends to prevent a dead end from being formed in the common collecting channel 321.

The number of supply ports 312 communicating with one common supply channel 322 and the number of collection ports 311 communicating with one common collecting channel 321 may be the same for symmetry of the design. The supply ports 312 and the collection ports 311 may be formed in a staggered arrangement at positions where the opposite ends of the common supply channel 322 and the opposite ends of the common collecting channel 321 are not aligned in the direction in which the discharge port array extends.

In this embodiment, the supply ports 312 and the collection ports 311, the common supply channel 322 and the common collecting channel 321, the individual supply channels 324 and the individual collecting channels 323 may be formed at inverted positions. Also in this case, forming at least one of the supply ports 312 and the collection ports 311 nearer to the opposite ends of the discharge module 300 than the discharge port array prevents a dead end to be formed, providing the effect of the present disclosure.

In a liquid discharge apparatus including a serial liquid discharge head, if a trouble such as a paper jam occurs during printing to stop the liquid discharge head halfway through scanning, the power source is automatically turned off for safety to stop the circulation of the liquid. If the issue cannot be immediately addressed, the off state is left, and the discharge ports of the liquid discharge head are left in contact with air, which may cause liquid thickening and sticking due to evaporation, resulting in a discharge failure. Accordingly, the liquid discharge head of an embodiment of the present disclosure may be incorporated in a liquid discharge apparatus including a serial liquid discharge head.

The above configuration prevents a dead end from being formed in a common channel from the supply port or the collection port to the discharge port, thereby reducing or eliminating sticking of liquid and a discharge failure.

Second Embodiment

The configuration of a discharge module 300 according to a second embodiment of the present disclosure will be described. In the following description, only the difference from the first embodiment will be mainly described, and description of the same parts as in the first embodiment will be omitted.

FIG. 10 is a schematic diagram of the discharge module 300 of the second embodiment. In the second embodiment, the supply ports 312 and the collection ports 311 are arranged in parallel. In other words, the openings of the plurality of supply ports and the openings of the plurality of collection ports are at least partly aligned in the direction in which the discharge port array extends. Also with this configuration, forming at least one of the supply ports 312 and the collection ports 311 nearer to the opposite ends of the discharge module 300 than the discharge port array prevents a dead end to be formed, providing the effect of the present disclosure. This configuration allows the number of supply ports 312 or collection ports 311 communicating with one common supply channel 322 or one common collecting channel 321 to be increased, making it easier for the liquid to flow, thereby reducing liquid sticking and discharge failure.

With the above configuration, even if the openings of the plurality of supply ports and the openings of the plurality of collection ports are aligned in the direction in which the discharge port array extends, no dead end is formed, thereby reducing liquid sticking and discharge failure.

Combinations of the configurations of the above embodiments are also applicable.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-091391, filed Jun. 6, 2022, which is hereby incorporated by reference herein in its entirety.

What is claimed is:

1. A liquid discharge head comprising:

a discharge port array in which a plurality of discharge ports configured to discharge liquid is arrayed;

a plurality of pressure chambers respectively communicating with the plurality of discharge ports;

a common supply channel configured to supply liquid to the plurality of pressure chambers; and a supply port array in which a plurality of supply ports configured to supply liquid to the common supply channel is arrayed, wherein the discharge port array and the supply port array extend from a first end of the liquid discharge head to a second end of the liquid discharge head, wherein the plurality of discharge ports in the discharge port array includes a first-end discharge port closest to the first end and a second-end discharge port closest to the second end, wherein the plurality of supply ports in the supply port array includes a first-end supply port closest to the first end and a second-end supply port closest to the second end, wherein, as seen from a position facing openings of the plurality of discharge ports, an end of an opening of the first-end supply port adjacent to the first end is at a position nearer to the first end than an end of an opening of the first-end discharge port adjacent to the first end, and wherein at least one of:

an end of an opening of the first-end supply port adjacent to the second end is at a position nearer to the first end than an end of the opening of the first-end discharge port adjacent to the first end, and an end of an opening of the second-end supply port adjacent to the first end is at a position nearer to the second end than an end of an opening of the second-end discharge port adjacent to the second end.

2. The liquid discharge head according to claim 1, wherein an end of an opening of the second-end supply port adjacent to the second end is at a position nearer to the second end than the end of an opening of the second-end discharge port adjacent to the second end.

3. The liquid discharge head according to claim 1, further comprising:

a common collecting channel configured to collect liquid from the plurality of pressure chambers; and a collection port array in which a plurality of collection ports configured to collect liquid from the common collecting channel is arrayed, wherein the plurality of collection ports in the collection port array includes a first-end collection port at the first end and a second-end collection port at the second end.

4. The liquid discharge head according to claim 3, wherein an end of an opening of the first-end collection port adjacent to the first end is at a position nearer to the first end than the end of the opening of the first-end discharge port adjacent to the first end.

5. The liquid discharge head according to claim 4, wherein an end of an opening of the first-end collection port adjacent to the second end is at a position nearer to the first end than the end of the opening of the first-end discharge port adjacent to the first end.

6. The liquid discharge head according to claim 5, wherein an end of an opening of the second-end collection port adjacent to the second end is at a position nearer to the second end than an end of an opening of the second-end discharge port adjacent to the second end.

7. The liquid discharge head according to claim 6, wherein an end of an opening of the second-end collection port adjacent to the first end is at a position nearer to the second end than the end of the opening of the second-end discharge port adjacent to the second end.

8. The liquid discharge head according to claim 3, wherein openings of the plurality of supply ports and openings of the plurality of collection ports are not aligned in a direction in which the discharge port array extends.

9. The liquid discharge head according to claim 8, wherein the common supply channel is longer than the common collecting channel in the direction in which the discharge port array extends.

10. The liquid discharge head according to claim 8, wherein the common supply channel is longer than the discharge port array in the direction in which the supply port array extends.

11. The liquid discharge head according to claim 10, wherein the common collecting channel is longer than the discharge port array in the direction in which the supply port array extends.

12. The liquid discharge head according to claim 3, wherein opposite ends of the common supply channel are not aligned with opposite ends of the common collecting channel in a direction in which the discharge port array extends.

13. The liquid discharge head according to claim 3, wherein at least part of openings of the plurality of supply ports and openings of the plurality of collection ports are aligned in a direction in which the discharge port array extends.

14. A liquid discharge apparatus comprising:

a liquid discharge head; and a mount on which the liquid discharge head is mounted, wherein the mount is configured to move back and forth with respect to a recording medium, wherein the liquid discharge head includes:

a discharge port array in which a plurality of discharge ports configured to discharge liquid is arrayed, a plurality of pressure chambers individually communicating with the plurality of discharge ports, a common supply channel configured to supply liquid to the plurality of pressure chambers, a supply port array in which a plurality of supply ports configured to supply liquid to the common supply channel is arrayed;

a common collecting channel configured to collect liquid from the plurality of pressure chambers, a collection port array in which a plurality of collection ports configured to collect liquid from the common collecting channel is arrayed, and a pump configured to circulate liquid, wherein the discharge port array and the supply port array extend from a first end of the liquid discharge head to a second end of the liquid discharge head, wherein the plurality of discharge ports in the discharge port array includes a first-end discharge port closest to the first end and a second-end discharge port closest to the second end, wherein the plurality of supply ports in the supply port array includes a first-end supply port closest to the first end and a second-end supply port closest to the second end, wherein, as seen from a position facing openings of the plurality of discharge ports, an end of an opening of the first-end supply port adjacent to the first end is at a position nearer to the first end than an end of an opening of the first-end discharge port adjacent to the first end, wherein the plurality of collection ports in the collection port array includes a first-end collection port at the first end and a second-end collection port at the second end, and wherein an end of an opening of the second-end supply port adjacent to the first end is at a position nearer to the second end than the end of the opening of the second-end discharge port adjacent to the second end.

15. A liquid discharge head comprising:

a discharge port array in which a plurality of discharge ports configured to discharge liquid is arrayed;

a plurality of pressure chambers individually communicating with the plurality of discharge ports;

a common supply channel configured to supply liquid to the plurality of pressure chambers;

a supply port array in which a plurality of supply ports configured to supply liquid to the common supply channel is arrayed;

a common collecting channel configured to collect liquid from the plurality of pressure chambers; and a collection port array in which a plurality of collection ports configured to collect liquid from the common collecting channel is arrayed, wherein the discharge port array and the collection port array extend from a first end of the liquid discharge head to a second end of the liquid discharge head, wherein the plurality of discharge ports in the discharge port array includes a first-end discharge port at the first end and a second-end discharge port at the second end, wherein the plurality of collection ports in the collection port array includes a first-end collection port at the first end and a second-end collection port at the second end, wherein, as seen from a position facing openings of the plurality of discharge ports, an end of an opening of the first-end collection port adjacent to the first end is at a position nearer to the first end than an end of an opening of the first-end discharge port adjacent to the first end, and wherein an end of an opening of the first-end collection port adjacent to the second end is at a position nearer to the first end than the end of the opening of the first-end discharge port adjacent to the first end.

16. The liquid discharge head according to claim 15, wherein the plurality of supply ports in the supply port array includes a first-end supply port closest to the first end and a second-end supply port closest to the second end, and wherein at least one of:

an end of an opening of the first-end supply port adjacent to the second end is at a position nearer to the first end than the end of the opening of the first-end discharge port adjacent to the first end, and an end of an opening of the second-end supply port adjacent to the first end is at a position nearer to the second end than the end of the opening of the second-end discharge port adjacent to the second end.

17. The liquid discharge head according to claim 15, wherein an end of an opening of the second-end collection port adjacent to the second end is at a position nearer to the second end than an end of an opening of the second-end discharge port adjacent to the second end.

18. The liquid discharge head according to claim 17, wherein an end of an opening of the second-end collection port adjacent to the first end is at a position nearer to the second end than the end of the opening of the second-end discharge port adjacent to the second end.

* * * * *